(12) United States Patent
Ikeda

(10) Patent No.: US 8,323,118 B2
(45) Date of Patent: Dec. 4, 2012

(54) DYNAMIC DAMPER FOR HOLLOW ROTATING SHAFT

(75) Inventor: Masahiro Ikeda, Tottori (JP)

(73) Assignee: NOK Corporation (JP)

( * ) Notice: Subject to any disclaimer, the term of this patent is extended or adjusted under 35 U.S.C. 154(b) by 170 days.

(21) Appl. No.: 12/968,574

(22) Filed: Dec. 15, 2010

(65) Prior Publication Data

US 2011/0159972 A1 Jun. 30, 2011

(30) Foreign Application Priority Data

Dec. 28, 2009 (JP) ................................ 2009-297524

(51) Int. Cl.
*F16F 7/108* (2006.01)

(52) U.S. Cl. ...................................... 464/180; 188/380

(58) Field of Classification Search .................. 464/180; 188/379, 380
See application file for complete search history.

(56) References Cited

U.S. PATENT DOCUMENTS

| 3,075,406 | A  | * | 1/1963 | Butler, Jr. et al. | ......... | 464/180 X |
| 5,904,622 | A  | * | 5/1999 | Breese et al. | .................. | 464/180 |
| 6,725,985 | B2 | * | 4/2004 | Haneishi et al. | .............. | 188/379 |

FOREIGN PATENT DOCUMENTS

JP 2007-177830 7/2007

* cited by examiner

*Primary Examiner* — Gregory Binda
(74) *Attorney, Agent, or Firm* — Harness, Dickey & Pierce, P.L.C.

(57) ABSTRACT

In order to achieve downsizing, and to prevent a cleaning fluid from staying inside, a dynamic damper for a hollow rotating shaft is provided with a mass body floatingly inserted to an inner periphery of the hollow rotating shaft, of which a vibration is to be reduced, and an elastic body structured such that an inner diameter portion is fitly attached to an outer periphery of the mass body and an outer diameter portion is brought into pressure contact with an inner peripheral surface of the hollow rotating shaft, and made of a rubber-like elastic material, wherein grooves having both ends open to spaces at both sides in an axial direction of the elastic body are formed in one of fitted surfaces to each other of the mass body and the elastic body.

3 Claims, 5 Drawing Sheets

DYNAMIC DAMPER FOR HOLLOW ROTATING SHAFT

BACKGROUND OF THE INVENTION

1. Field of the Invention

The present invention relates to a dynamic damper which is attached to an inner peripheral space of a hollow rotating shaft such as a propeller shaft of a motor vehicle or the like, and suppresses a vibration and a noise which are generated in the hollow rotating shaft.

2. Description of the Conventional Art

A typical prior art of a dynamic damper, which is attached in an inner peripheral space of a propeller shaft corresponding to a hollow rotating shaft transmitting driving force output from an engine of a motor vehicle via a transmission to rear wheels and suppressing a vibration and a noise generated in this propeller shaft, is disclosed in Japanese Unexamined Patent Publication No. 2007-177830.

FIG. 9 is a sectional perspective view of an installed state and shows the same kind of conventional dynamic damper as that described in Japanese Unexamined Patent Publication No. 2007-177830 the patent document 1 by cutting along a plane passing through an axis together with a part of a propeller shaft. In other words, a dynamic damper 50 is constructed by an elastic body 51 which is formed in an approximately cylindrical shape by a rubber-like elastic material (a rubber material or a synthetic resin material having a rubber-like elasticity) so as to be pressure inserted to an inner peripheral surface of a propeller shaft 60, and a mass body 52 which is concentrically vulcanization bonded in the elastic body 51 and is made of a metal, and an additional vibration system constructed by the elastic body 51 and the mass body 52 reduces a vibration and a noise of the propeller shaft 60, on the basis of a dynamic damping action of resonating by an inverse phase to an input vibration, in a predetermined vibration frequency range.

However, as for the conventional dynamic damper 50, since the mass body 52 is pinched from both sides in an axial direction by convex portions (not shown) formed in a metal mold so as to be held, at a time of integrally vulcanization forming the elastic body 51 with the mass body 52, it is hard to make an outer diameter of the elastic body 51, that is, an outer diameter of the dynamic damper 50 small, in accordance with necessity for securing a pinching space. Accordingly, such is hardly applicable to a propeller shaft having a small diameter.

Further, when a cleaning of the propeller shaft is carried out after installation to an inner periphery of the propeller shaft 60, and the propeller shaft is stored in an upright state, a cleaning fluid entered into an inner portion of the propeller shaft 60 stays without being discharged. Further, there is a structure in which a plurality of notches 51a are formed in an outer peripheral surface of the elastic body 51, in order to facilitate installation to the propeller shaft 60, and the notches 51a contribute to the discharge of the cleaning fluid entered into the inner portion of the propeller shaft 60. However, since the elastic body 51 is formed in such a shape as to have inner peripheral holes 51b at both sides in an axial direction of the mass body 52, in accordance with necessity of securing a spring property in an axially orthogonal direction in the elastic body 51, and necessity of holding the mass body 52 by a part of the metal mold at a time of forming, the cleaning fluid entered into the inner peripheral hole 51b can not be discharged by the notches 51a.

It can be thought that a drain hole is provided in an axial core portion of the mass body 52, however, in this case, not only the number of processing steps is increased, but also the forming rubber material leaks into the drain hole from the portion where the mass body 52 is held by a part of the metal mold at a time of forming the elastic body 51 so as to clog the drain hole, so that there is a risk that productivity is lowered.

SUMMARY OF THE INVENTION

Problem to be Solved by the Invention

The present invention is made by taking the points mentioned above into consideration, and a technical object of the present invention is to easily make it possible to achieve downsizing, and to prevent a fluid used for cleaning a hollow rotating shaft from staying within the hollow rotating shaft due to a dynamic damper, in the dynamic damper which is attached to an inner peripheral space of the hollow rotating shaft such as a propeller shaft of a motor vehicle or the like.

Means for Solving the Problem

As a means for effectively solving the technical object mentioned above, in accordance with a first aspect of the present invention, there is provided a dynamic damper for a hollow rotating shaft, comprising:

a mass body floatingly inserted to an inner periphery of a hollow rotating shaft, of which is a vibration to be reduced; and an elastic body structured such that an inner diameter portion is fitted and attached to an outer periphery of the mass body and an outer diameter portion is brought into pressure contact with an inner peripheral surface of the hollow rotating shaft, and made of a rubber-like elastic material, wherein grooves having both ends open to spaces at both sides in an axial direction of the elastic body are formed in one of fitted surfaces to each other of the mass body and the elastic body.

Further, in accordance with a second aspect of the present invention, there is provided a dynamic damper for a hollow rotating shaft as recited in the first aspect, wherein the mass body is formed in a shaft shape, and the elastic body is constructed by an inner diameter tube portion which is fitted and attached to an outer peripheral surface of an intermediate portion in an axial direction of the mass body, a pair of outer diameter tube portions which are positioned at an outer periphery close to both end portions in the axial direction of the mass body so as to be brought into pressure contact with an inner peripheral surface of the hollow rotating shaft, and flexible portions each of which extends in a conical tubular shape between the inner diameter tube portion and each of the outer diameter tube portions.

Further, in accordance with a third aspect of the present invention, there is provided a dynamic damper for a hollow rotating shaft as recited in the first aspect, wherein the mass body is locked to the elastic body in the axial direction on the basis of mutual fitting between a fitting groove formed in an outer peripheral surface thereof, and a fitting protrusion formed in an inner peripheral surface of an inner diameter portion of the elastic body.

Effect of the Invention

On the basis of the dynamic damper for the hollow rotating shaft in accordance with the first aspect, since the elastic body is not integrally formed with the mass body, it is possible to downsize the elastic body at such a degree that a space for holding the mass body within the metal mold is not necessary at a time of forming. Further, since the elastic body and the mass body are not bonded, the dynamic damper can be manufactured at a low cost, and sorted waste collection can be done after disposal. Further, even if the elastic body has the same specification, it is possible to optionally change a specific frequency (a resonance frequency) of the dynamic damper by selecting the mass bodies having different lengths. Even in the case that the hollow rotating shaft is cleaned after the dynamic damper being installed to the inner periphery of the hollow rotating shaft, and is stored in an upright state, the cleaning fluid entered into the inner portion of the hollow rotating shaft at a time of cleaning can be discharged through the groove formed in one of the fitted surfaces to each other of the mass body and the elastic body. Therefore, it is possible to prevent the cleaning fluid from staying.

On the basis of the dynamic damper for the hollow rotating shaft in accordance with the second aspect, in addition to the effect obtained by the first aspect, since both the end portions in the axial direction of the mass body come into contact with the inner peripheral surfaces of the outer diameter tube portions in the elastic body so as to prevent a vibration amplitude from being increased any more, at a time point when a vibration displacement amount of the mass body reaches a fixed value, it is possible to prevent a noise from being generated by a direct contact of the mass body with the inner peripheral surface of the hollow rotating shaft.

On the basis of the dynamic damper for the hollow rotating shaft in accordance with the third aspect, in addition to the effect obtained by the first aspect, since the mass body is firmly fitted and attached to the elastic body, it is possible to effectively prevent a displacement and a break away of the mass body due to the vibration.

DETAILED DESCRIPTION OF PREFERRED EMBODIMENTS

Figure 1:
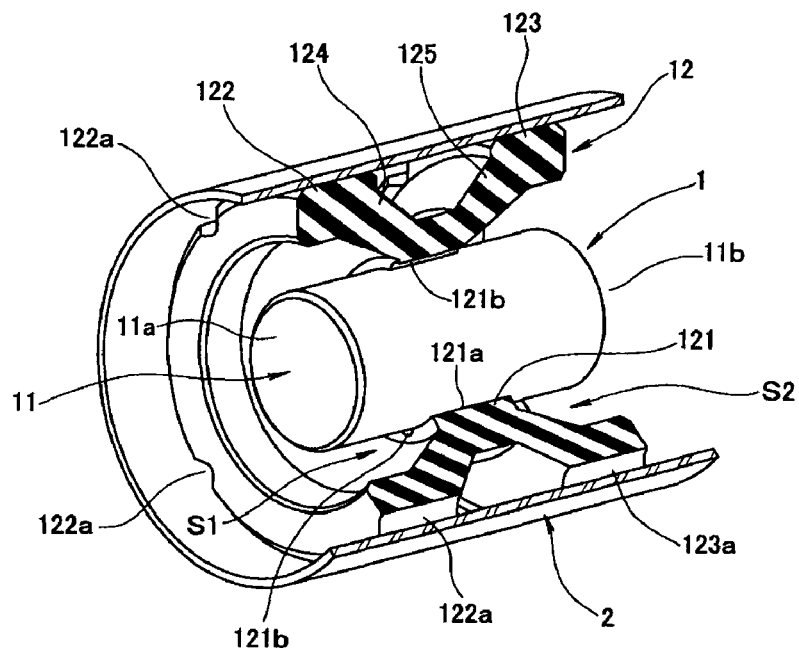
FIG. 1 is a sectional perspective view of an installed state and shows a first embodiment of a dynamic damper for a hollow rotating shaft in accordance with the present invention by cutting along planes which cross on an axis so as to form an obtuse angle, together with a part of a propeller shaft.
Figure 2:
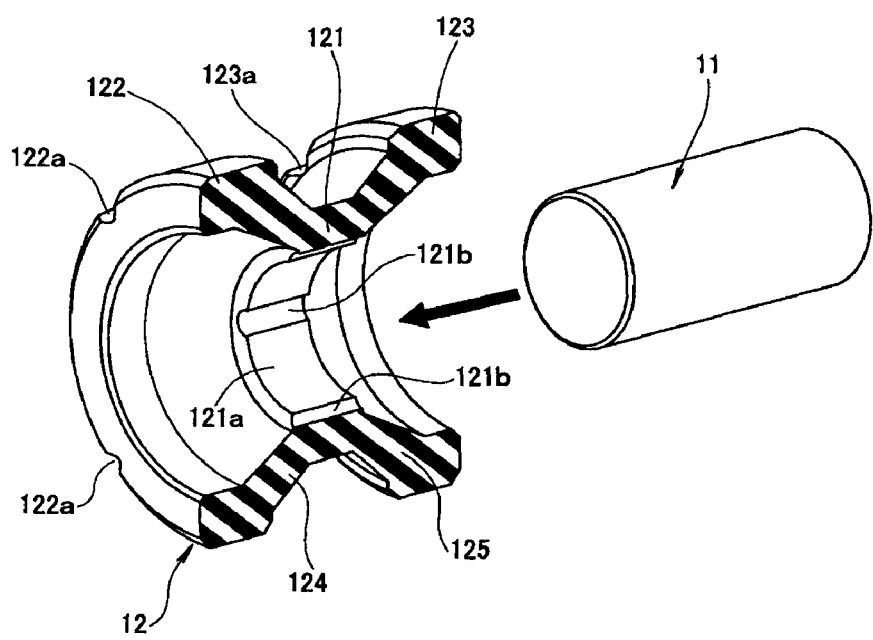
FIG. 2 is a sectional perspective view showing a separated state of an elastic body and a mass body in the first embodiment by cutting along a plane passing through the axis.

A description will be given below of preferable embodiments of a dynamic damper for a hollow rotating shaft in accordance with the present invention with reference to the accompanying drawings. FIG. 1 is a sectional perspective view of an installed state and shows a first embodiment of the present invention by cutting along planes which cross on an axis so as to form an obtuse angle, together with apart of a propeller shaft, and FIG. 2 is a sectional perspective view showing a separated state of an elastic body and a mass body in the first embodiment by cutting along a plane passing through the axis.

First of all, in FIG. 1, reference numeral 1 denotes a dynamic damper, and reference numeral 2 denotes a propeller shaft of a motor vehicle. The propeller shaft 2 corresponds to a hollow rotating shaft described in the first aspect of the present invention, in other words, it is formed in a hollow cylindrical shape, and the dynamic damper 1 is attached in an inner peripheral space of the propeller shaft 2.

The dynamic damper 1 is provided with amass body 11 which is floatingly inserted to an inner periphery of the propeller shaft 2, and an elastic body 12 which is structured such that an inner diameter portion is fitted and attached to an outer periphery of the mass body 11 and an outer diameter portion is brought into pressure contact with an inner peripheral surface of the propeller shaft 2, and is made of a rubber-like elastic material (a rubber material or a synthetic resin material having a rubber-like elasticity).

The mass body 11 is manufactured, for example, by cutting a metal rod, and is formed in a short columnar shaft shape.

The elastic body 12 is constructed by an inner diameter tube portion 121 which is fitted and attached to an outer peripheral surface of an intermediate portion in an axial direction of the mass body 11, a pair of outer diameter tube portions 122 and 123 which are positioned at an outer periphery close to both end portions 11a and 11b in the axial direction of the mass body 11 so as to be brought into pressure contact with an inner peripheral surface of the propeller shaft 2, and flexible portions 124 and 125 which extend in a shape like symmetrical conical tubes with each other in the axial direction between the inner diameter tube portion 121 and each of the outer diameter tube portions 122 and 123. Since the elastic body 12 is structured such that the flexible portions 124 and 125 are exposed to a repeated deformation in accordance with a relative displacement mainly in an axially orthogonal direction of the propeller shaft 2 and the mass body 11 on the basis of input of a vibration, and each of the flexible portions 124 and 125 extends in a conical tubular shape, the elastic body 12 has a shear deformation component with respect to both the axial vertical direction and the axially orthogonal, and can be flexibly deformable.

An outer diameter of the mass body 11 is smaller than an inner diameter of the outer diameter tube portions 122 and 123 of the elastic body 12. On the other hand, the outer diameter tube portions 122 and 123 of the elastic body 12 have such a fastening margin that they are not easily displaced by an input vibration or the like, with respect to the inner peripheral surface of the propeller shaft 2, and the inner diameter tube portion 121 of the elastic body 12 have such a fastening margin that the mass body 11 is not easily displaced by an input vibration or the like, with respect to the outer peripheral surface of the mass body 11. Further, outer peripheral edges of both the end portions 11a and 11b in the axial direction of the mass body 11 are suitably chamfered taking into consideration an inserting property to the inner diameter tube portion 121 of the elastic body 12.

A mass of the mass body 11, and a specific frequency of the dynamic damper 1 which is defined by a spring constant of the elastic body 12 are synchronized to a frequency band in which an amplitude of the vibration generated in the propeller shaft 2 is most increased.

As is also shown in FIG. 2, grooves 121b are formed at a plurality of positions in a circumferential direction, in a fitted surface to the outer peripheral surface of the mass body 11 in the elastic body 12, that is, an inner peripheral surface 121a of the inner diameter tube portion 121, the grooves 121b being structured such that both ends are open to spaces at both sides in the axial direction of the elastic body 12, in more detail, open to annular spaces S1 and S2 between the flexible portions 124 and 125 of the elastic body 12 and the outer peripheral surface of the mass body 11. These grooves 121b have such a depth that they are not completely clogged by a fastening margin of the inner diameter tube portion 121 of the elastic body 12 with respect to the outer peripheral surface of the mass body 11.

Further, notches 122a and 123a passing through in an axial direction are formed at a plurality of positions in a circumferential direction, in the outer peripheral surfaces of the outer diameter tube portions 122 and 123 of the elastic body 12 which is brought into pressure contact with the inner peripheral surface of the propeller shaft 2.

The dynamic damper 1 structured as mentioned above is installed, as shown in FIG. 2, by pressure inserting and fitting the mass body 11 to the inner periphery of the inner diameter tube portion 121 in the elastic body 12, and then pressure inserting them to a predetermined position in the inner periphery of the propeller shaft 2 shown in FIG. 1.

In this case, drain holes communicating between the annular spaces S1 and S2 at both sides in the axial direction of the elastic body 12 by the grooves 121b formed in the inner peripheral surface 121a exist between the inner peripheral surface 121a of the inner diameter tube portion 121 in the elastic body 12, and the outer peripheral surface of the mass body 11 fitted and attached thereto. Accordingly, even in the case that the propeller shaft 2 is cleaned after installation of the dynamic damper 1 to the inner peripheral surface of the propeller shaft 2, and is stored in an upright state, a cleaning fluid entered into the inner peripheral space of the propeller shaft 2 at a time of cleaning is discharged through the drain holes (the grooves 121b). Accordingly, it is possible to prevent the cleaning fluid from staying in the annular space S1 or S2.

In this case, since the drain holes passing through in the axial direction by the notches 122a and 123a formed in the outer peripheral surfaces of the outer diameter tube portions 122 and 123 exist between the outer peripheral surfaces of the outer diameter tube portions 122 and 123 in the elastic body 12, and the inner peripheral surface of the propeller shaft 2 fitted and attached thereto, a part of the cleaning fluid entered into the inner peripheral space of the propeller shaft 2 at a time of cleaning is discharged also from these drain holes (the notches 122a and 123a).

In this installed state, when the propeller shaft is rotated, the vibration due to the rotation is generated in the axially orthogonal direction. Further, since the specific frequency of the dynamic damper 1 is tuned to the frequency band in which the amplitude of the vibration of the propeller shaft 2 is increased most, the dynamic damper 1 resonates in the frequency band mentioned above, and a phase of a vibration wave form comes to an inverse phase to the input vibration. Therefore, it is possible to reduce a peak of the amplitude of the input vibration and it is possible to effectively reduce the vibration and the noise of the propeller shaft 2, on the basis of the dynamic damping action.

Further, if the displacement amount of the mass body 11 with respect to the axially orthogonal direct ion is increased by resonance or centrifugal force, and reaches a fixed value, the outer peripheral surfaces close to both the end portions 11a and 11b in the axial direction of the mass body 11 come into contact with the inner peripheral surfaces of the outer diameter tube portions 122 and 123 in the elastic body 12 at this time point so as to prevent more displacement. Accordingly, it is possible to prevent the mass body from coming into metal contact with the inner peripheral surface of the propeller shaft 2, and prevent the noise from being generated thereby.

Further, in accordance with the dynamic damper 1, since the elastic body 12 is not vulcanization bonded (integrally vulcanization bonded) to the mass body 11, it is possible to make the elastic body 12 and further the dynamic damper 1 small in diameter at such a degree that a space for holding the mass body 11 is not necessary within the metal mold (not shown) at a time of the vulcanization forming, and it is accordingly possible to apply to the small-diameter propeller shaft 2.

Further, since the elastic body 12 and the mass body 11 are not bonded, it is possible to reduce a forming cost, and it is possible to allow sorted waste collection of the mass body 11 after disposal. Further, it is possible to optionally change the specific frequency of the dynamic damper 1 by using the elastic body 12 having the same specification, and selecting the mass bodies 11 having the different lengths. In other words, the elastic body 12 can be used in common even in the case that the specific frequency is changed. Accordingly, it is not necessary to change the specification of the elastic body 12 each time when the specific frequency is changed, and it is possible to reduce a manufacturing cost of the metal mold for forming the elastic body 12.

Figure 3:
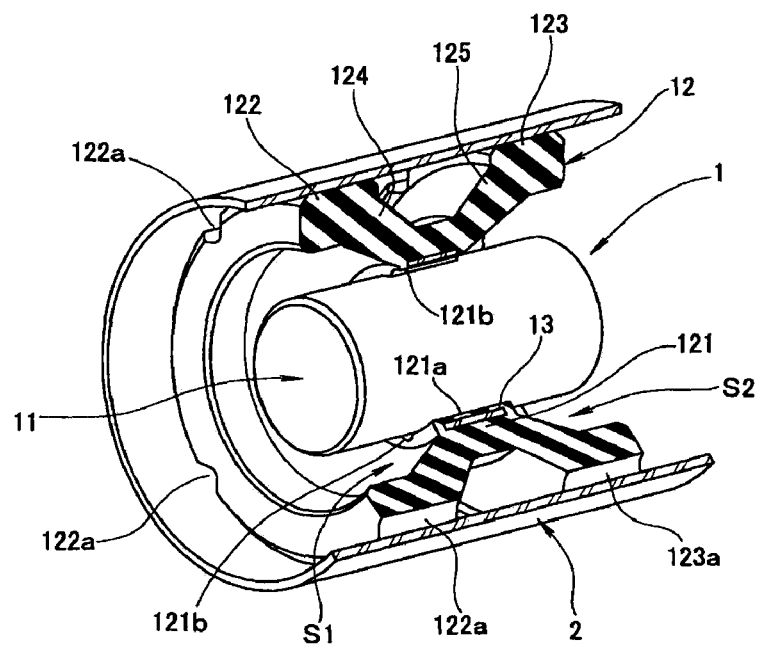
FIG. 3 is a sectional perspective view of an installed state and shows a second embodiment of a dynamic damper for a hollow rotating shaft in accordance with the present invention by cutting along planes which cross on an axis so as to form an obtuse angle, together with a part of a propeller shaft.

Next, FIG. 3 is a sectional perspective view of an installed state and shows a second embodiment of the dynamic damper for the hollow rotating shaft in accordance with the present invention by cutting along planes which cross on an axis so as to form an obtuse angle, together with a part of the propeller shaft.

The second embodiment is structured such that a cylindrical metal ring 13 is integrally vulcanization bonded in an embedded state to the inner diameter tube portion 121 of the elastic body 12, in addition to the structure of the first embodiment described above.

In other words, in accordance with the second embodiment, in addition to the effect of the first embodiment, since it is possible to enhance fitting force of the inner diameter tube portion 121 of the elastic body 12 with respect to the outer peripheral surface of the mass body 11 on the basis of the embedment of the metal ring 13, the mass body 11 can be firmly held to the elastic body 12, and it is possible to effectively prevent the displacement and the breakaway of the mass body 11 due to the vibration.

Figure 4:
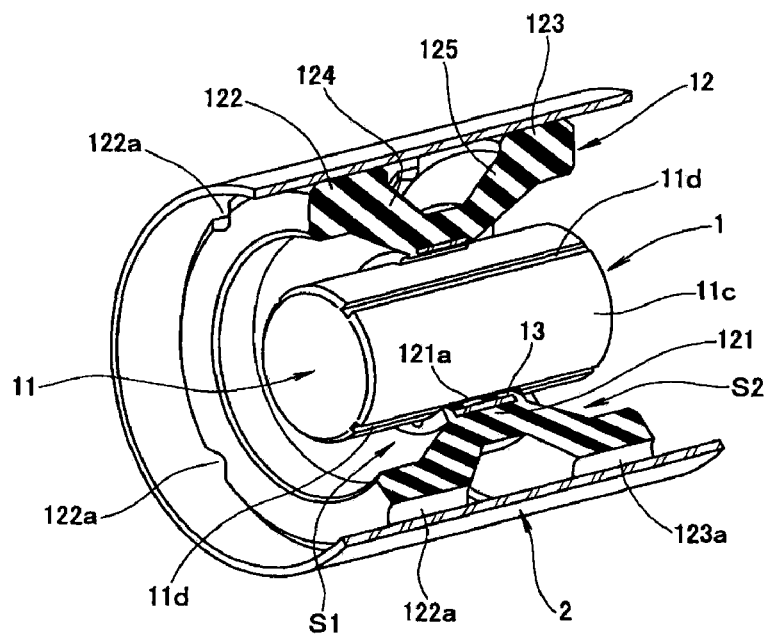
FIG. 4 is a sectional perspective view of an installed state and shows a third embodiment of a dynamic damper for a hollow rotating shaft in accordance with the present invention by cutting along planes which cross on an axis so as to form an obtuse angle, together with a part of a propeller shaft.

Next, FIG. 4 is a sectional perspective view of an installed state and shows a third embodiment of the dynamic damper for the hollow rotating shaft in accordance with the present invention by cutting along planes which cross on an axis so as to form an obtuse angle, together with a part of the propeller shaft.

This third embodiment is structured such that grooves 11d having both ends open to both side spaces in the axial direction of the elastic body 12 are formed at a plurality of positions in a circumferential direction in the outer peripheral surface 11c of the mass body 11 fitted to the inner peripheral surface 121a of the inner diameter tube portion 121, as shown in FIG. 4, in place of the grooves 121b which are formed in the inner peripheral surface 121a of the inner diameter tube portion 121 of the elastic body 12 in the second embodiment shown in FIG. 3 described above. In this case, in the illustrated embodiment, the grooves 11d extend over a whole length in a longitudinal direction of the mass body 11.

In other words, in accordance with the third embodiment, drain holes communicating with the both side spaces in the axial direction of the elastic body 12 by the grooves 11d formed in the outer peripheral surface 11c of the mass body 11 exist between the inner peripheral surface 121a of the inner diameter tube portion 121 in the elastic body 12, and the outer peripheral surface 11c of the mass body 11 fitted and attached thereto. Accordingly, in the same manner as the first or second embodiment, since the cleaning fluid entered into the inner peripheral space of the propeller shaft 2 at a time of cleaning the propeller shaft 2 is discharged through the drain holes (the grooves 11d), it is possible to prevent the cleaning fluid from staying in the annular space S1 or S2 between the flexible portion 124 or 125 formed in the conical tubular shape in the elastic body 12 and the outer peripheral surface 11c of the mass body 11.

Figure 5:
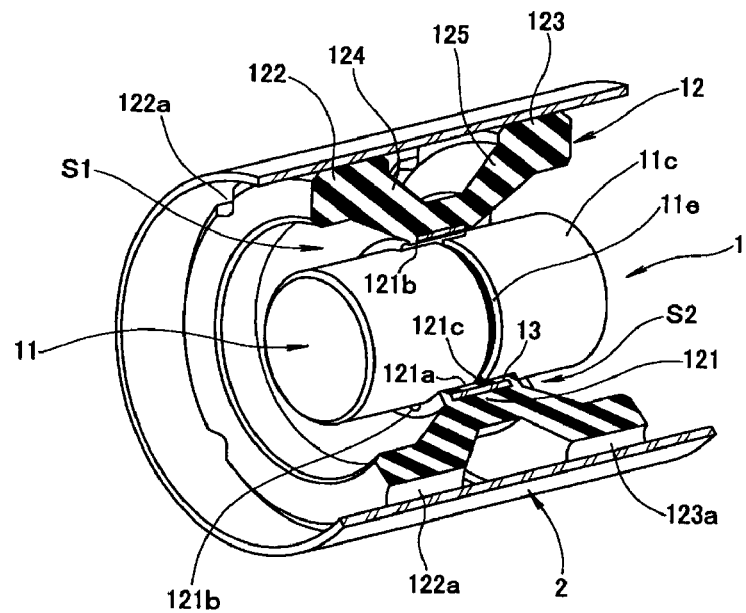
FIG. 5 is a sectional perspective view of an installed state and shows a fourth embodiment of a dynamic damper for a hollow rotating shaft in accordance with the present invention by cutting along planes which cross on an axis so as to form an obtuse angle, together with a part of a propeller shaft.
Figure 6:
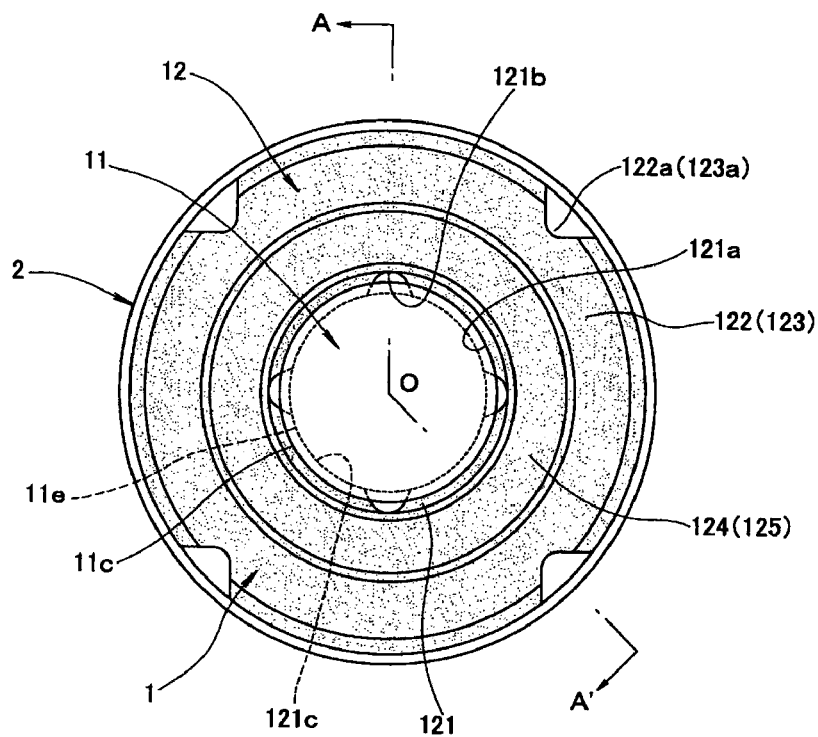
FIG. 6 is a view as seen in a direction of the axis in FIG. 5.
Figure 7:
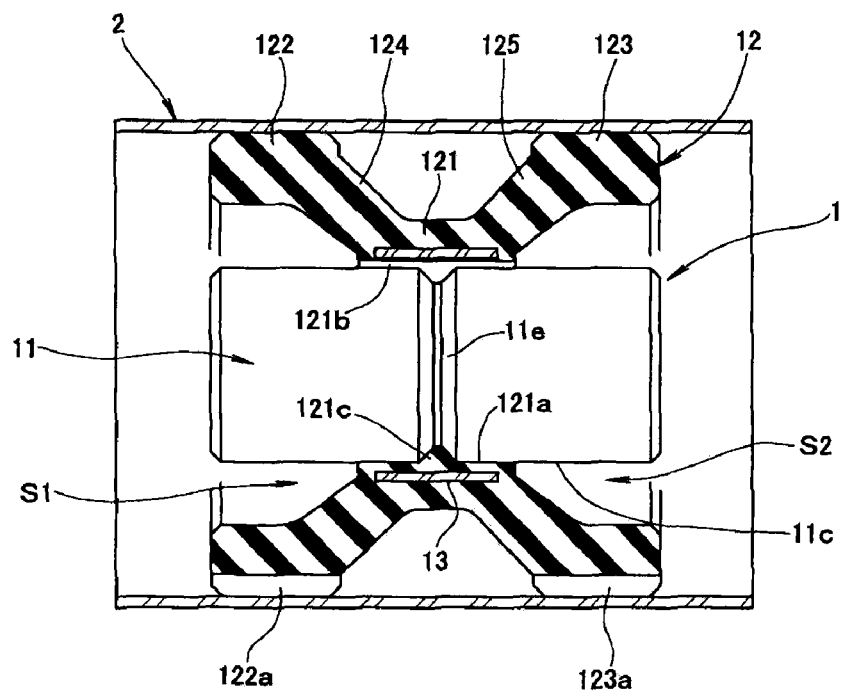
FIG. 7 is a sectional view along a line A-O-A' in FIG. 6.
Figure 8:
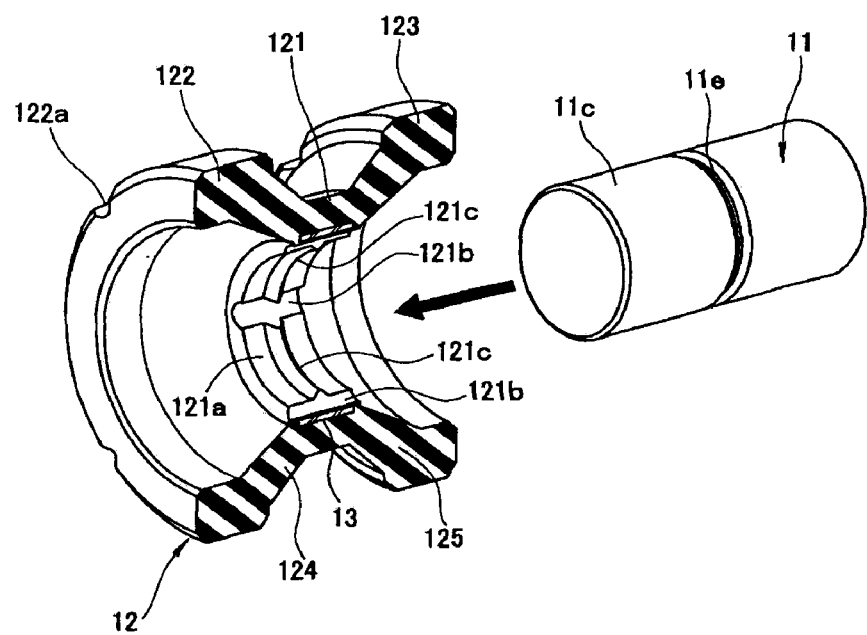
FIG. 8 is a sectional perspective view showing a separated state of an elastic body and a mass body in the fourth embodiment by cutting along a plane passing through the axis.
Figure 9:
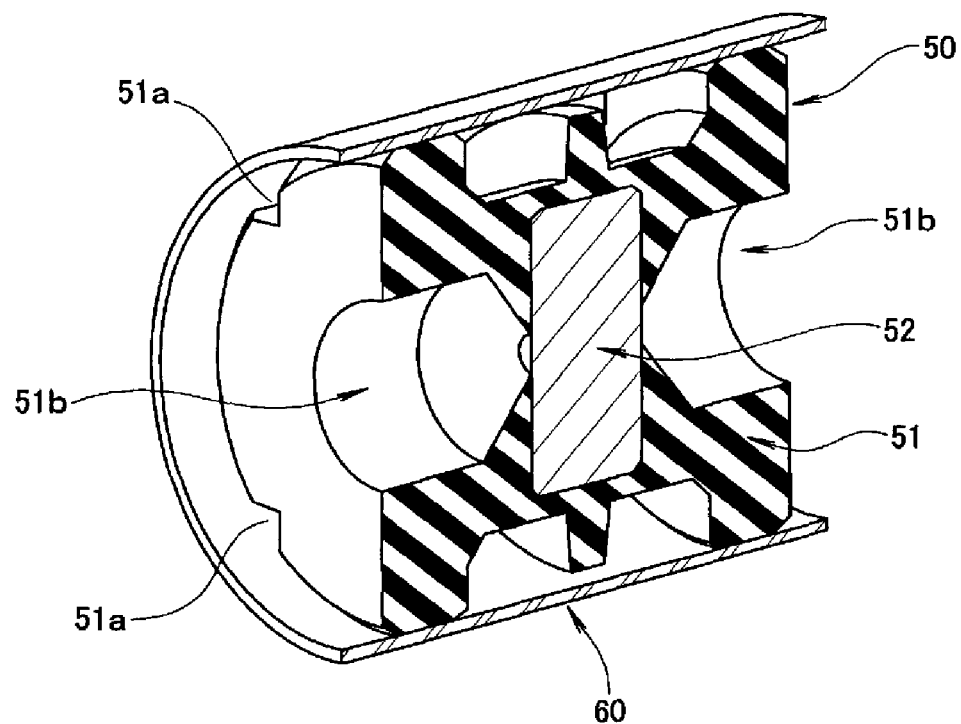
FIG. 9 is a sectional perspective view of an installed state and shows a dynamic damper for a hollow rotating shaft in accordance with a prior art by cutting along a plane passing through an axis together with a part of a propeller shaft.

Next, FIG. 5 is a sectional perspective view of an installed state and shows a fourth embodiment of the dynamic damper for the hollow rotating shaft in accordance with the present invention by cutting along planes which cross on an axis so as to form an obtuse angle, together with a part of the propeller shaft, FIG. 6 is a view as seen in a direction of the axis in FIG. 5, FIG. 7 is a sectional view along a line A-O-A' in FIG. 6, and FIG. 8 is a sectional perspective view showing a separated state of an elastic body and a mass body in the fourth embodiment by cutting along a plane passing through the axis.

The fourth embodiment is structured such that a fitting groove 11e which is continuous in the circumferential direction is formed in a center portion in the axial direction in the outer peripheral surface 11c of the mass body 11, and a fitting protrusion 121c fitted to the fitting groove 11e is formed in a center portion in the axial direction of the inner peripheral surface 121a of the inner diameter tube portion 121 in the elastic body 12, in addition to the structure of the second embodiment shown in FIG. 3 described above.

As shown in FIG. 7, the fitting groove 11e of the mass body 11 is formed to have an approximately V-shaped cross section, the fitting protrusion 121c of the inner diameter tube portion 121 of the elastic body 12 is formed in a chevron cross sectional shape corresponding to the shape of the fitting groove 11e, and the fitting protrusion 121c extends in a circumferential direction between the draining grooves 121b, as shown in FIG. 8. In other words, the draining grooves 121b are formed in such a manner as to segment the fitting protrusion 121c in the circumferential direction.

The fitting protrusion 121c has such a cross sectional area that can be approximately completely collapsed between the metal ring 13 embedded in the inner diameter tube portion 121 of the elastic body 12 and the outer peripheral surface 11c of the mass body 11. Accordingly, the fitting protrusion 121c allows insertion of the mass body 11 while being collapsed, in a process of pressure inserting the mass body 11 into the inner diameter tube portion 121 of the elastic body 12 from a separated state shown in FIG. 8. At this time, since the fitting protrusion 121C is formed in a chevron cross sectional shape, it does not fall down by being brought into slidable contact with the outer peripheral surface 11c of the mass body 11 at the inserting process of the mass body 11, but is collapsed in a stable attitude. Further, when the fitting groove 11e of the mass body 11 reaches the inner peripheral side of the fitting protrusion 121c, the collapsed fitting protrusion 121c rises on the basis of its elasticity so as to be fitted to the fitting groove 11e.

In other words, in accordance with the fourth embodiment, since the mass body 11 is firmly held to the elastic body 12 on the basis of the fitting between the fitting groove 11e formed in the center portion in the axial direction of the outer peripheral surface 11c, and the fitting protrusion 121c formed in the inner peripheral surface 121a of the inner diameter tube portion 121 in the elastic body 12, it is possible to more securely prevent the displacement and the breakaway of the mass body 11 in accordance with the vibration.

Further, since the fitting protrusion 121c does not block the draining grooves 121b, and the fitting groove 11e is formed to have the approximately V-shaped cross section, the cleaning fluid entered into the inner peripheral space of the propeller shaft 2 at a time of cleaning the propeller shaft 2 is not obstructed in its flow by the fitting groove 11e, at a time when it is discharged through the draining grooves 121b. Accordingly, it is possible to prevent the cleaning fluid from staying in the annular space S1 or S2 between the flexible portion 124 or 125 of the elastic body 12 and the outer peripheral surface 11c of the mass body 11.

What is claimed is:

1. A dynamic damper for a hollow rotating shaft, comprising:
   a mass body floatingly inserted to an inner periphery of a hollow rotating shaft, of which a vibration is to be reduced; and
   an elastic body structured such that an inner diameter portion is fitted and attached to an outer periphery of the mass body and an outer diameter portion is brought into pressure contact with an inner peripheral surface of said hollow rotating shaft, and made of a rubber-like elastic material,
   wherein grooves having both ends open to spaces at both sides in an axial direction of said elastic body are formed in one of fitted surfaces to each other of said mass body and the elastic body.

2. The dynamic damper for a hollow rotating shaft as claimed in claim 1, wherein the mass body is formed in a shaft shape, and the elastic body is constructed by an inner diameter tube portion which is fitted and attached to an outer peripheral surface of an intermediate portion in an axial direction of said mass body, a pair of outer diameter tube portions which are positioned at an outer periphery close to both end portions in the axial direction of said mass body so as to be brought into pressure contact with an inner peripheral surface of the hollow rotating shaft, and flexible portions each of which extends in a conical tubular shape between said inner diameter tube portion and each of the outer diameter tube portions.

3. The dynamic damper for a hollow rotating shaft as claimed in claim 1, wherein the mass body is locked to said elastic body in the axial direction on the basis of mutual fitting between a fitting groove formed in an outer peripheral surface thereof, and a fitting protrusion formed in an inner peripheral surface of an inner diameter portion of the elastic body.

* * * * *